United States Patent
He et al.

(10) Patent No.: US 8,430,319 B2
(45) Date of Patent: Apr. 30, 2013

(54) IMAGING READER FOR ELECTRO-OPTICALLY READING TWO-DIMENSIONAL SYMBOLS WITH CONTROLLER HAVING LIMITED INTERNAL MEMORY

(75) Inventors: Duanfeng He, South Setauket, NY (US); Bradley Carlson, Huntington, NY (US); Anatoly A Kotlarsky, Churchville, PA (US)

(73) Assignee: Symbol Technologies, Inc., Holtsville, NY (US)

(*) Notice: Subject to any disclaimer, the term of this patent is extended or adjusted under 35 U.S.C. 154(b) by 137 days.

(21) Appl. No.: 13/023,022

(22) Filed: Feb. 8, 2011

(65) Prior Publication Data

US 2012/0199657 A1 Aug. 9, 2012

(51) Int. Cl.
*G06K 7/10* (2006.01)
(52) U.S. Cl.
USPC ...................................... 235/470; 235/462.09
(58) Field of Classification Search .................. 235/470, 235/454, 462.01, 462.09, 462.15
See application file for complete search history.

(56) References Cited

U.S. PATENT DOCUMENTS

| | | | | |
|---|---|---|---|---|
| 6,336,587 | B1* | 1/2002 | He et al. | 235/462.45 |
| 6,637,658 | B2* | 10/2003 | Barber et al. | 235/462.45 |
| 6,824,058 | B2* | 11/2004 | Patel et al. | 235/462.2 |
| 6,918,538 | B2* | 7/2005 | Breytman et al. | 235/454 |

OTHER PUBLICATIONS

"Analog Devices," Precision Analog Microcontroller, 12-Bit Analog I/O, Large Memory, ARM7TDMI MCU with Enhanced IRQ Handler, accessed at http://www.analog.com/static/imported-files/data_sheets/ADuC7124.pdf.

* cited by examiner

*Primary Examiner* — Daniel St. Cyr

(57) ABSTRACT

An imaging reader has a two-dimensional array of image sensors for capturing return light from a two-dimensional symbol over a field of view as pixel data to be stored in internal random access memory (RAM) of a controller even though the internal RAM has less storage bytes than the number of sensors. The controller determines a size and a location of the symbol in the field of view, maps and subdivides the symbol into a plurality of image capture zones based on the symbol size and location, sequentially captures the return light from each zone, sequentially stores the pixel data from each zone into the internal RAM, sequentially digitizes the stored pixel data from each zone as digitized data, and decodes the digitized data from all the zones.

15 Claims, 8 Drawing Sheets

IMAGING READER FOR ELECTRO-OPTICALLY READING TWO-DIMENSIONAL SYMBOLS WITH CONTROLLER HAVING LIMITED INTERNAL MEMORY

DESCRIPTION OF THE RELATED ART

Solid-state imaging systems or imaging readers have been used, in both handheld and hands-free modes of operation, to electro-optically read targets, such as one-dimensional bar code symbols, particularly of the Universal Product Code (UPC) type, each having a linear row of bars and spaces spaced apart along a scan direction, as well as two-dimensional symbols, such as Code 49, which introduced the concept of vertically stacking a plurality of rows of bar and space patterns in a single symbol. Other two-dimensional code structures for increasing the amount of data that can be represented or stored on a given amount of surface area are PDF417 and Datamatrix.

The imaging reader includes an imaging module having a solid-state imager with a sensor array of photocells or light sensors, which correspond to image elements or pixels in a two-dimensional field of view of the imager, and an imaging lens assembly for capturing return light scattered and/or reflected from the symbol being imaged, and for projecting the return light onto the sensor array to initiate capture of an image of the symbol as pixel data. The imager may be a one- or two-dimensional charge coupled device (CCD) or a complementary metal oxide semiconductor (CMOS) device and includes associated circuits for producing and processing electrical signals corresponding to a one- or two-dimensional array of the pixel data over the field of view. The imager captures the return light under the control of a controller or programmed microprocessor that can access a memory that broadly includes random access memory (RAM) and read only memory (ROM), both of which may be internal to the controller and/or external to the controller as separate memory chips. The controller is then operative for digitizing and decoding the electrical signals of the entire image of the symbol into data indicative of the symbol being imaged and read.

It is known to use the imager for capturing a monochrome image of the symbol and also to use the imager with multiple buried channels, or multiple color filters, for capturing a full color image of the symbol. It is common to provide a two-dimensional CCD with a 640×480 resolution commonly found in VGA monitors, although other resolution sizes are possible.

The memory in known imaging readers is used for many purposes. For example, operating software is typically installed in the external ROM and is often loaded therefrom to the external RAM (usually, but not necessarily, at startup), and the operating software is executed from the external RAM during operation. The external RAM is also typically used to store variables and other changeable data needed during running of the operating software. The external RAM is also typically used for such tasks as temporarily storing codewords, performing error correction, and formatting output data corresponding to the symbol being read.

The external RAM is also typically used in the known readers to store the pixel data of the entire symbol. Typically, one byte of storage in the external RAM is used to store one value of the pixel data. The more prevalent use of imaging readers for reading two-dimensional symbols, especially in automatic identification applications, has even more burdened the external RAM, because of the increased amount of pixel data that is contained in a two-dimensional symbol, as opposed to a one-dimensional symbol. For the above-mentioned common two-dimensional CCD with a 640×480 resolution, more than 300,000 storage bytes are needed in the external RAM, just to accommodate the pixel data. For higher resolution CCDs, the external RAM storage needs more capacity.

To reduce the cost and the footprint of the known imaging readers, it would be advantageous to eliminate the need for the external RAM and the external ROM and to instead rely on the internal RAM and the internal ROM to satisfy all the memory storage requirements of the reader. However, as described above, this memory storage requirement is relatively large, especially for reading two-dimensional symbols, and hence expensive controllers having large internal RAM and/or ROM capacities would need to be used. It would be desirable to allow less expensive controllers having much smaller internal RAM and ROM capacities to be used. For example, one such cheaper controller has only 32 kB of RAM. However, a full image of a two-dimensional symbol requiring at least 300,000 storage bytes to be stored in the internal RAM could not be stored or efficiently processed, especially in view of the other memory storage obligations of the reader.

It would, therefore, be desirable to enable the use of low cost controllers and, in turn, low cost readers of two-dimensional symbols, especially in applications where the reader is not a stand-alone system (as in retail stores), but is incorporated into other apparatus in which the reader is a subsidiary system. For example, the reader could be incorporated into a smart phone or tablet computer. In another exemplary application, the reader could be incorporated into a coffee maker in which a reader reads a symbol on a coffee packet prior to brewing coffee.

SUMMARY OF THE INVENTION

The present invention relates to an imaging reader for electro-optically reading a two-dimensional symbol that has a plurality of elements or modules of different light reflectivity, e.g., black and white areas, spaced apart lengthwise and widthwise of the symbol. The reader includes a solid-state imager supported by the reader and having a two-dimensional array of image sensors for capturing return light from the symbol as pixel data over a field of view. Preferably, the imager is a CCD or a CMOS, whose sensors (also known as pixels) are arranged in mutually orthogonal multiple rows and columns. The array has a resolution, that is, a predetermined pixel count number of the sensors. By way of non-limiting numerical example, a CCD with a 640×480 resolution has a pixel count number of 307,200.

The imager captures the return light under the control of a controller or programmed microprocessor that is operative for storing the pixel data of the entire symbol into a memory accessible by the controller. Preferably, one byte of storage in the memory is used to store one value of the pixel data. The controller is then operative for digitizing and decoding the electrical signals of the entire image of the symbol into data indicative of the symbol being imaged and read. In the prior art, as previously described, the memory used to store the pixel data was an external RAM chip that had to have at least as many storage bytes as the pixel count number.

One feature of the present invention is directed to eliminating the need for the external RAM and the external ROM, and instead relies on the internal RAM and the internal ROM to satisfy all the memory storage requirements of the reader, especially the requirement to store the pixel data in internal RAM, without having to use an expensive controller having large internal RAM and/or ROM capacities. The present invention proposes using an internal RAM having a predetermined storage number of storage bytes that is less than, and, preferably, by an order of magnitude (10 times) less than, the pixel count number. In a preferred embodiment, the controller according to this invention can, for example, have only 32 kB of internal RAM, as described below.

In accordance with the present invention, the controller is operatively connected to the imager and the internal memory, and is operative for determining a size and a location of the symbol in the field of view, for mapping and subdividing the symbol into a plurality of image capture zones as a function of the determined size and location of the symbol, for sequentially capturing the return light from each zone, for sequentially storing the pixel data from each zone into the internal memory, for sequentially digitizing the stored pixel data from each zone as digitized data, and for decoding the digitized data from all the zones.

Thus, the internal memory need only accommodate the pixel data in only one of the image capture zones at a time. Less expensive controllers having much smaller internal memories can now be used. External memory chips are not needed. If an external memory chip is used, then it will have a lower capacity than heretofore. Low cost readers of two-dimensional symbols can now even be incorporated into other apparatus in which the reader is a subsidiary system.

The size and location of the symbol in the field of view are preferably determined as follows: The controller initially enables the imager to capture the return light over a plurality of columns centrally located in the field of view, to determine top and bottom edges of the symbol. It is assumed that the symbol will be located somewhere in the middle of the field of view. Subsequently, the controller enables the imager to capture the return light over a plurality of upper rows in which the top edge is centrally located, and over a plurality of lower rows in which the bottom edge is centrally located, to determine top and bottom corners of the symbol. Now, the width and the length of the symbol, and its location, are known from knowledge of the coordinates of the corners.

Thereupon, the controller determines how many of the image capture zones are needed. This determination is based on the size of the symbol and the predetermined storage number of storage bytes in the internal memory. The zones cover the entire symbol and may overlap, depending on the algorithms used and other factors, such as the rotational angle or tilt of the symbol presented relative to the sensor array, and the size of the symbol.

Another way of reducing the large memory storage requirement is to down-sample the pixel data to reduce the amount of the pixel data to be stored in the internal memory. The down-sampling is usually done in two dimensions in equal measure. For example, rather than storing each value of pixel data in a memory storage byte, the pixel data can be grouped. A group can consist, for example, of a 2×2 array of 4 values. Then, one of the values of the group can be selected to represent the entire group, or an average of all the values of the group can be selected to represent the entire group. In this way, only one value, rather than four values, are stored and processed. The down-sampling of the image data can advantageously be combined with the algorithms discussed above. In other words, each time when an area of the image is read into the memory, it is also down-sampled. The down-sampling can be performed by the controller, or, if the imager supports it, can be performed advantageously by the imager.

Another feature of the present invention resides in a method of electro-optically reading a two-dimensional symbol. The method is performed by capturing return light from the symbol as pixel data over a field of view of a solid-state imager having a two-dimensional array of image sensors, configuring the array with a predetermined pixel count number of the sensors, configuring a memory with a predetermined storage number of storage bytes that is less than the pixel count number, determining a size and a location of the symbol in the field of view, mapping and subdividing the symbol into a plurality of image capture zones as a function of the determined size and location of the symbol, sequentially capturing the return light from each zone, sequentially storing the pixel data from each zone into the memory, sequentially digitizing the stored pixel data from each zone as digitized data, and decoding the digitized data from all the zones.

The present invention is particularly suitable for situations where a target bearing the symbol can be maintained in a fixed position relative to the reader, such that multiple images can be taken of the same symbol, wherein each of the images is substantially identical to the others, and wherein each of the images is only utilized by the algorithms partially. Alternatively, an imager with local pixel value storage and a non-destructive readout feature can be used, so that the same image can be read out by parts in multiple steps.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
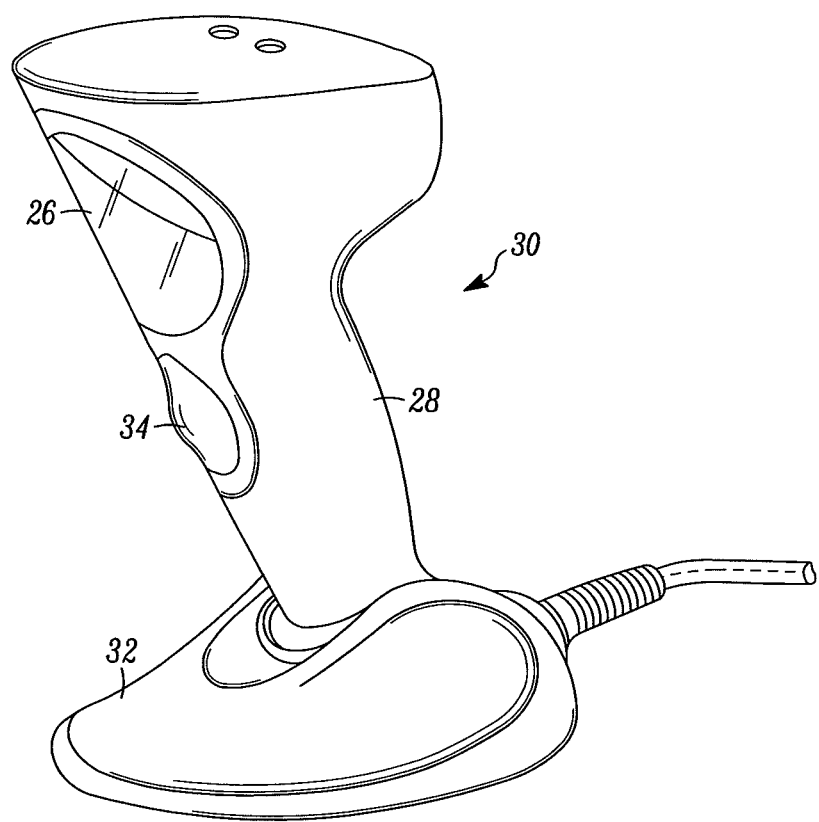
FIG. 1 is a perspective view of an imaging reader in a hands-free mode for capturing return light from target symbols.

Reference numeral 30 in FIG. 1 generally identifies an imaging reader having a generally upright window 26 and a gun-shaped housing 28 supported by a base 32 for supporting the imaging reader 30 on a counter top. The imaging reader 30 can thus be used in a hands-free mode as a stationary workstation in which products are slid, swiped past, or presented to, the window 26, or can be picked up off the counter top and held in an operator's hand and used in a handheld mode in which the reader is moved, and a trigger 34 is manually depressed to initiate imaging of indicia, especially two-dimensional symbols, to be read at a distance from the window 26.

It will be understood that housings of many other configurations could be employed; for example, the imaging reader could be configured as a box-shaped, vertical slot scanner that rests on a counter top, or as a bi-optical workstation having dual windows. The reader need not be a stand-alone system as illustrated, but could also be incorporated into a smart phone or tablet computer. In another exemplary application, the reader could be incorporated into a coffee maker in which a reader reads a symbol on a coffee packet prior to brewing coffee.

Figure 2:
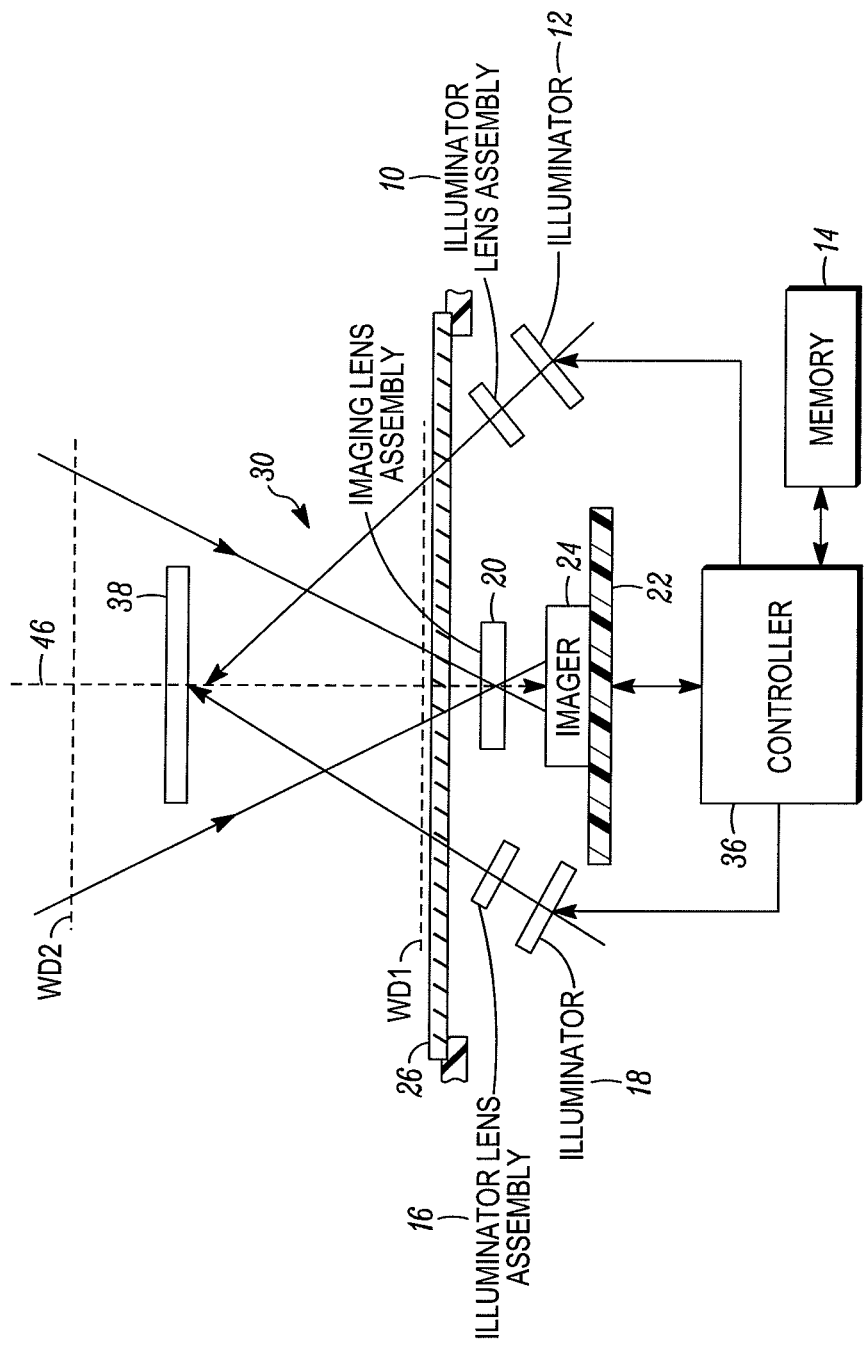
FIG. 2 is a schematic diagram of various components of the reader of FIG. 1.

As schematically shown in FIG. 2, an imager 24 is mounted on a printed circuit board 22 in the reader 30. The imager 24 is a solid-state device, for example, a CCD or a CMOS imager having a two-dimensional array of addressable image sensors or pixels arranged in mutually orthogonal, multiple rows and columns (see FIGS. 3-4), and operative for detecting return light captured by an imaging lens assembly 20 along an optical path or axis 46 through the window 26. The array has a resolution, that is, a predetermined pixel count number of the sensors. By way of non-limiting numerical example, a CCD with a 640×480 resolution has a pixel count number of 307,200.

Figure 5:
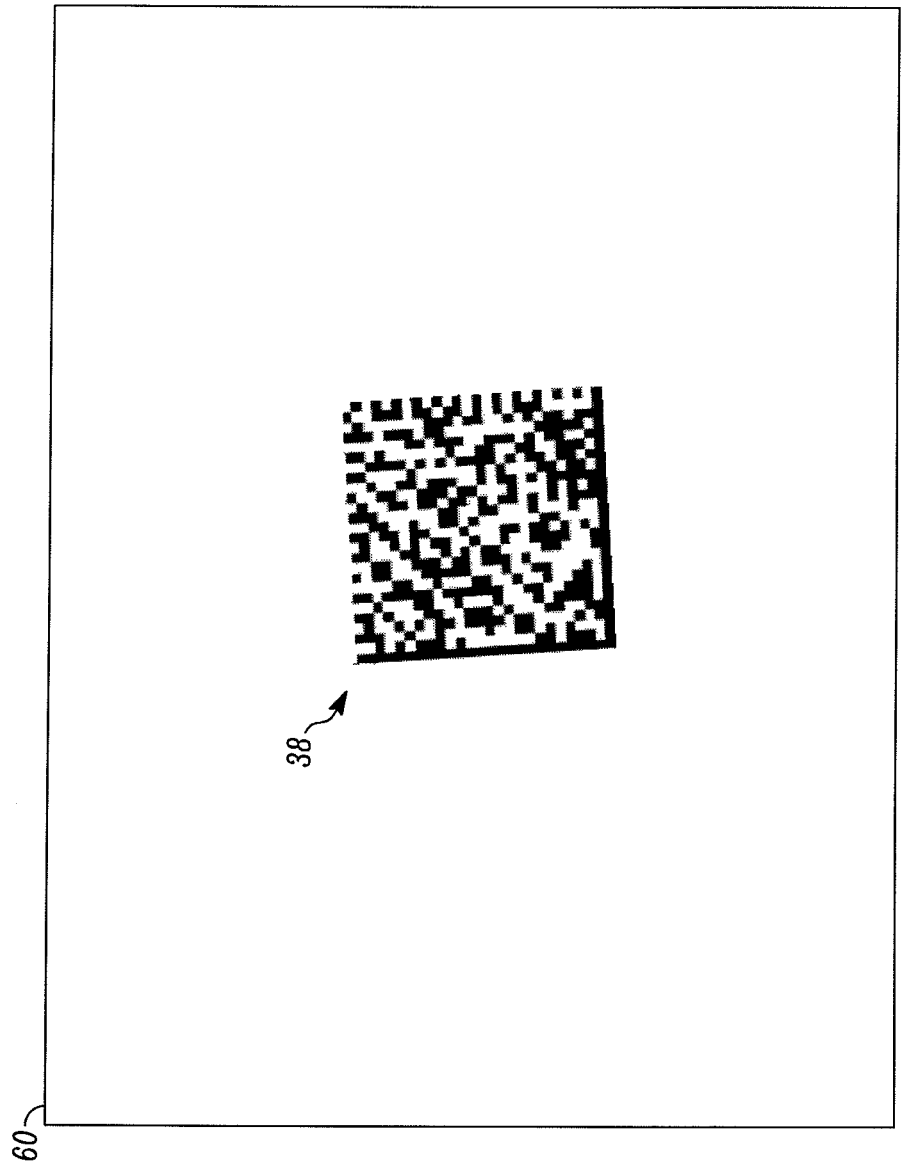
FIG. 5 is a view depicting a representative, tilted, two-dimensional symbol within a field of view of an imager of the reader of FIG. 1.

The return light is scattered and/or reflected from a target or two-dimensional symbol 38 as pixel data over a two-dimensional field of view 60 (see FIG. 5). The symbol 38 of FIG. 5 has a square shape, is tilted, and will be recognized as a Datamatrix symbol. It will be understood that symbols of different shapes and symbologies could also be used. The symbol can be tilted to different degrees, or need not be tilted at all. The imaging lens assembly 20 is operative for adjustably focusing the return light onto the array of image sensors to enable the symbol 38 to be read. The symbol 38 may be located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also advantageously mounted in the imaging reader 30 and preferably includes a pair of illuminators or illuminating light sources 12, 18, e.g., light emitting diodes (LEDs), and a pair of illuminating lens assemblies 10, 16 to uniformly illuminate the symbol 38 with an illuminating light having an intensity level over an illumination time period. The light sources 12, 18 are preferably pulsed.

As shown in FIG. 2, the imager 24 and the illuminating light sources 12, 18 are operatively connected to a controller or programmed microprocessor 36 operative for controlling the operation of these components. The microprocessor 36 includes a digitizer for digitizing the pixel data captured from the target symbols, and a decoder for decoding the digitized pixel data. A memory 14 is accessible by the controller 36 for storing and retrieving the pixel data, as well as other data and operating software, as described above. The memory 14 includes RAM for storing the pixel data, and ROM, preferably a flash type memory, for storing the software. The memory 14 is shown in FIG. 2 as a single separate component in FIG. 2 merely for simplicity. In the preferred embodiment of this invention, the memory 14, both RAM and ROM, is built into, and internally integrated with, the controller 36. The internal memory 14 has a predetermined storage number of storage bytes.

In operation, the controller 36 sends a command signal to pulse the illuminating light sources 12, 18 for the illumination time period, say 500 microseconds or less, and energizes and exposes the imager 24 to collect light, e.g., illumination light and/or ambient light, from the symbol 38 during an exposure time period. A typical array needs about 16-33 milliseconds to acquire the entire target image and operates at a frame rate of about 30-60 frames per second.

The imager 24 captures the return light under the control of the controller 36 that is operative for storing the pixel data of the entire symbol 38 into the internal RAM of memory 14. Preferably, one byte of storage in the internal RAM of memory 14 is used to store one value of the pixel data. In the prior art, as previously described, the memory used to store the pixel data was an external RAM chip that had to have at least as many storage bytes as the pixel count number, e.g., in the above example, 307,200 bytes.

One feature of the present invention is directed to eliminating the prior art need for any external RAM and any external ROM, and instead relies on the internal RAM and the internal ROM of the controller 36 to satisfy all the memory storage requirements of the reader, especially the requirement to store the pixel data in the internal RAM of memory 14, without having to use an expensive controller having large internal RAM and/or ROM capacities. The present invention proposes using the internal RAM of memory 14 with a predetermined storage number of storage bytes that is less than, and, preferably, by an order of magnitude (10 times) less than, the pixel count number. In a preferred embodiment, the controller 36 according to this invention can have, for example, only 32 kB of the internal RAM.

In accordance with the present invention, the controller 36 is operatively connected to the imager 24 and the internal memory 14, and is operative for determining a size and a location of the symbol 38 in the field of view 60 (see FIGS. 6-7), for mapping and subdividing the symbol 38 into a plurality of image capture zones (see FIG. 8) as a function of the determined size and location of the symbol 38, for sequentially capturing the return light from each zone, for sequentially storing the pixel data from each zone into the internal memory 14, for sequentially digitizing the stored pixel data from each zone as digitized data, and for decoding the digitized data from all the zones.

Thus, the internal memory 14 need only accommodate the pixel data in only one of the image capture zones at a time. Less expensive controllers 36 having much smaller internal memories can now be used. External memory chips can be eliminated. If an external memory chip is used to store the pixel data, then its capacity is much reduced from that required heretofore. Low cost readers of two-dimensional symbols can now even be incorporated into other apparatus in which the reader is a subsidiary system.

Figure 3:
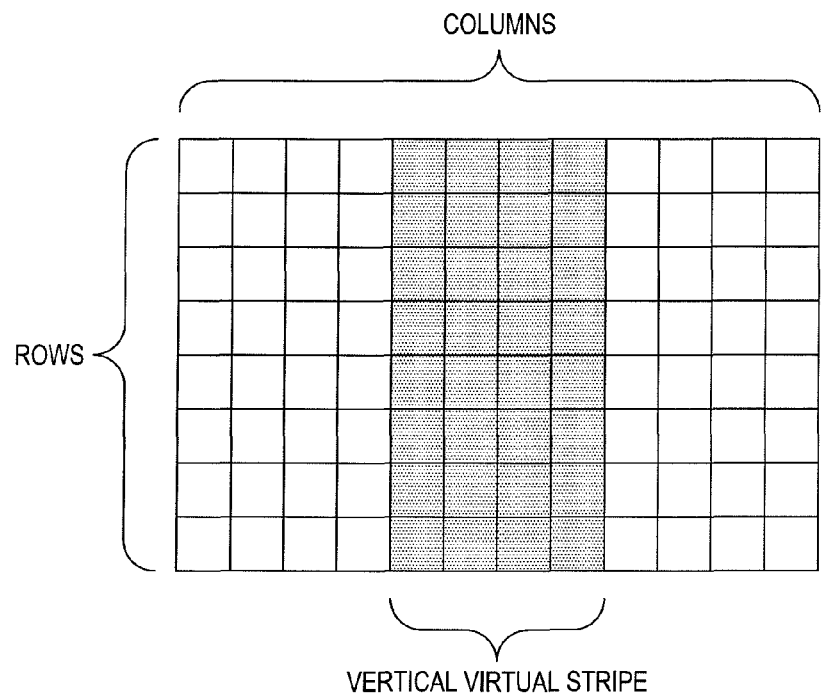
FIG. 3 is a schematic diagram depicting the mapping of a vertical virtual stripe by components of the reader of FIG. 1.

The size and the location of the symbol 38 in the field of view 60 are preferably determined as follows: The controller 36 initially enables the imager 24 to capture the return light over a plurality of columns centrally located in the field of view 60. FIG. 3 schematically illustrates, by stippling, that the sensors in the four vertical columns in the middle of the array of the imager 24 are energized as a "vertical virtual stripe" to capture light. Of course, the sensors in more than four columns can be energized and, in a preferred embodiment, the sensors in sixteen columns are so energized.

Figure 6:
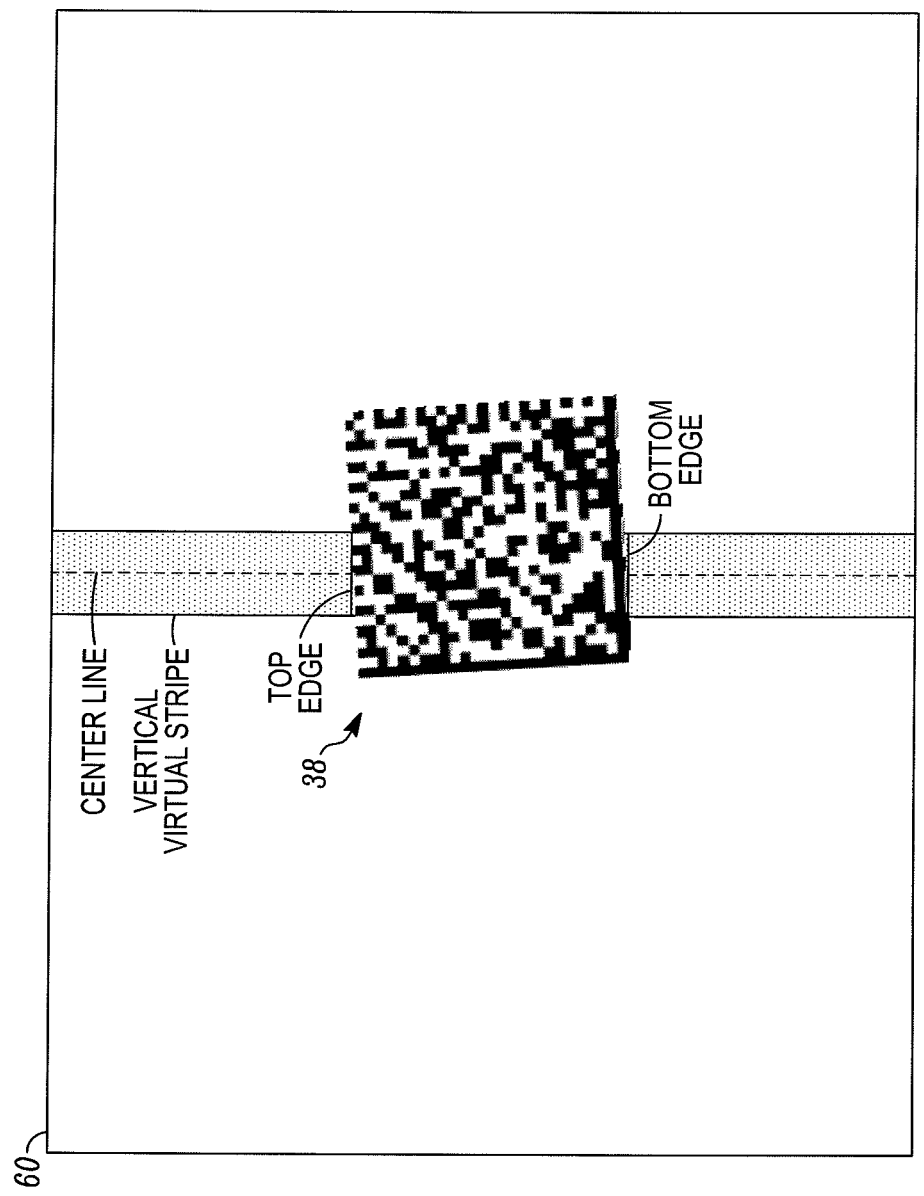
FIG. 6 is a view depicting how the top and bottom edges of the symbol of FIG. 5 are determined by using the vertical virtual stripe of FIG. 3.

This vertical stripe is depicted in FIG. 6 in an overlying relationship with the symbol 38 to be read. It is assumed that the symbol 38 will be located somewhere in the middle of the field of view 60, i.e., along the center line. The pixel data corresponding to the image captured by this vertical stripe is analyzed by the controller 36 to determine the top and bottom edges of the symbol 38. The locations of the top and bottom edges enables the height of the symbol 38 to be determined. If the aspect ratio of the symbol is known in advance, then the width of the symbol can also be determined. Now, the size of the symbol has been determined. Since the vertical stripe is, as mentioned above, preferably about sixteen columns wide, the slopes of the top and bottom edges and, thus, the tilt of the symbol 38, can also be determined.

Figure 4:
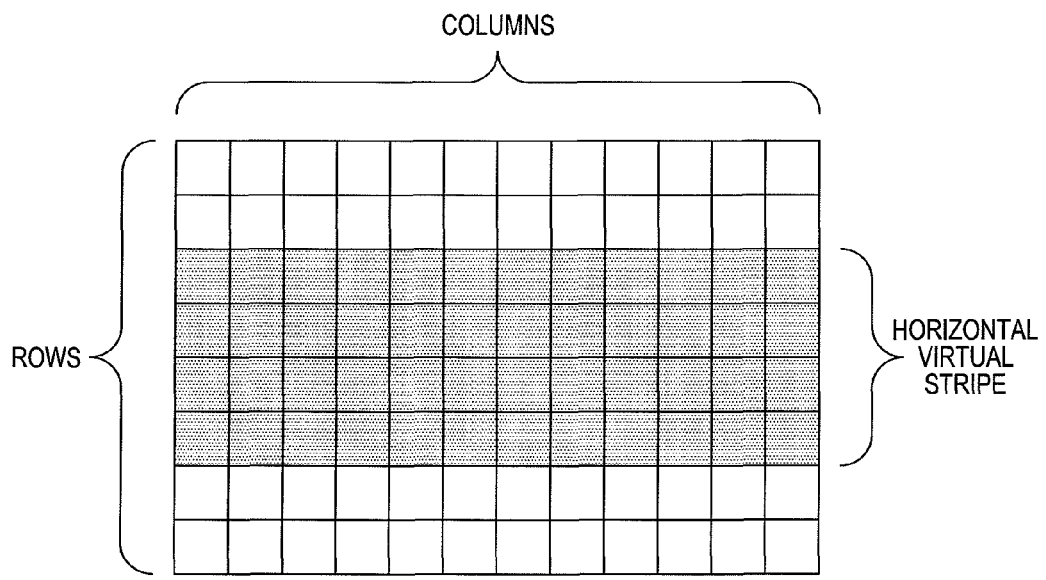
FIG. 4 is a schematic diagram depicting the mapping of a horizontal virtual stripe by components of the reader of FIG. 1.
Figure 7:
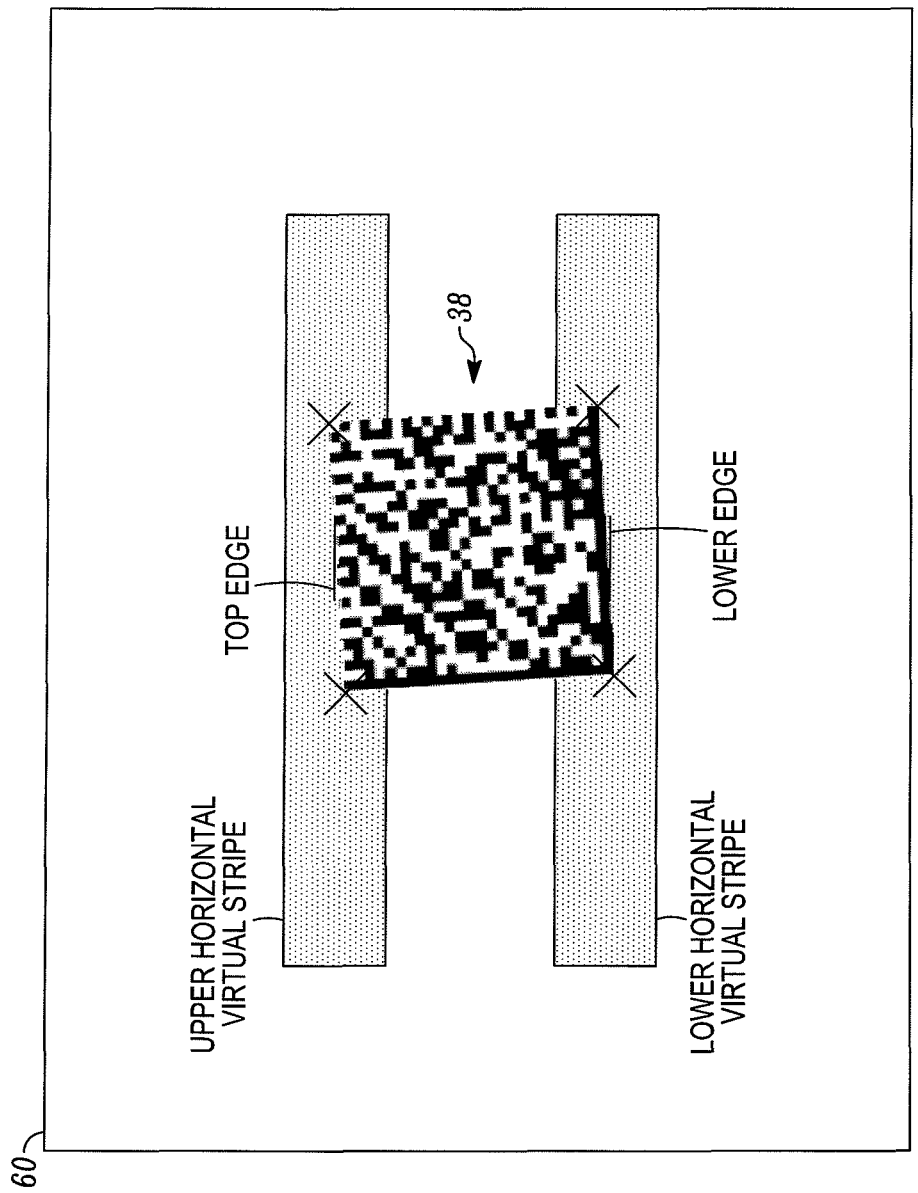
FIG. 7 is a view depicting how the top and bottom corners of the symbol of FIG. 5 are determined by using a pair of the horizontal virtual stripes of FIG. 3.

FIG. 4 schematically illustrates, by stippling, that the sensors in four horizontal rows of the imager 24 are energized as a "horizontal virtual stripe" to capture light. Of course, the sensors in more than four rows can be energized and, in a preferred embodiment, the sensors in sixteen rows are so energized. Subsequently, as shown in FIG. 7, the controller 36 enables the imager 24 to capture the return light over a plurality of upper rows (upper horizontal stripe) in which the top edge is centrally located, and over a plurality of lower rows (lower horizontal stripe) in which the bottom edge is centrally located. The pixel data corresponding to the image captured by these two horizontal stripes are analyzed by the controller 36 to determine the coordinates of the top and bottom corners (marked with an X) of the symbol 38. Now, the location of the symbol has been determined.

Figure 8:
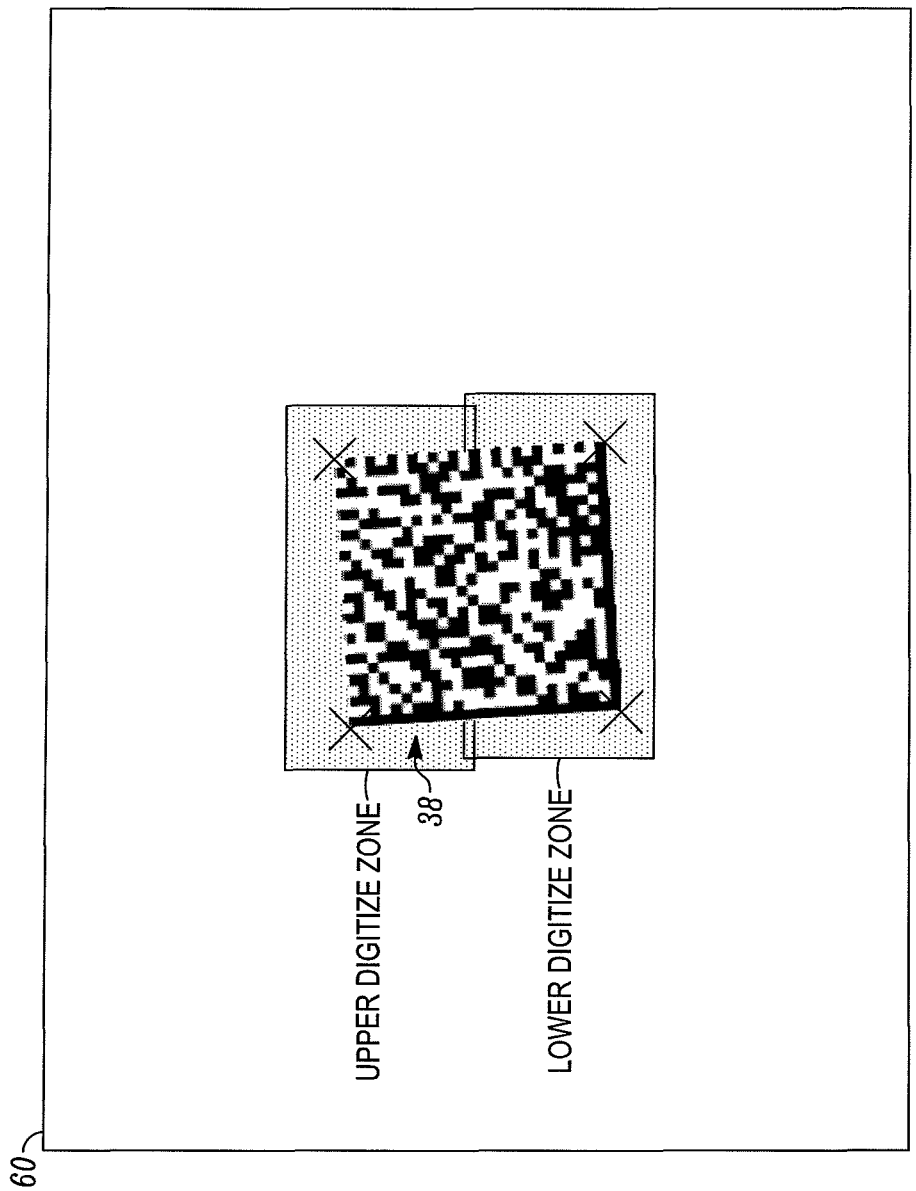
FIG. 8 is a view depicting how the symbol of FIG. 5 is mapped and subdivided into image capture zones to be individually digitized.

Thereupon, the controller 36 determines how many of the image capture zones are needed. This determination is based on the size of the symbol 38 and the predetermined storage number of storage bytes in the internal memory 14. As shown in FIG. 8, a pair of zones cover the entire symbol 38 and may overlap, depending on the algorithms used and other factors, such as the rotational angle or tilt of the symbol presented relative to the sensor array, and the size of the symbol. More than two zones can also be employed.

Another way of reducing the large memory storage requirement is to down-sample the pixel data to reduce the amount of the pixel data to be stored in the internal memory 14. The down-sampling is usually done in two dimensions in equal measure. For example, rather than storing each value of pixel data in a memory storage byte, the pixel data can be grouped. A group can consist, for example, of a 2×2 array of 4 values. Then, one of the values of the group can be selected to represent the entire group, or an average of all the values of the group can be selected to represent the entire group. In this way, only one value, rather than four values, are stored and processed. The down-sampling of the image data can advantageously be combined with the algorithms discussed above. In other words, each time when an area of the image is read into the memory 14, it is also down-sampled. The down-sampling can be performed by the controller 36, or, if the imager 24 supports it, can be performed advantageously by the imager 24.

Figure 9:
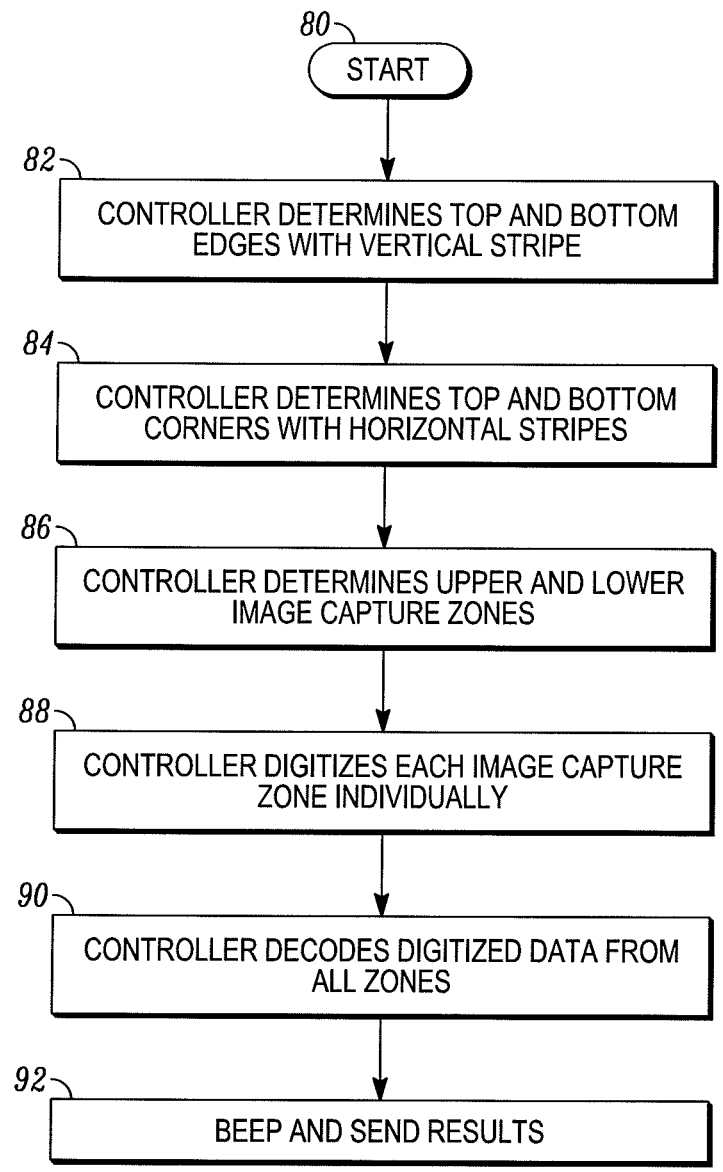
FIG. 9 is a flow chart depicting a method according to this invention.

FIG. 9 depicts a flow chart outlining the above steps of the method of this invention. Starting from the start step 80, the controller 36 first determines, in step 82, the top and bottom edges of the symbol 38 by using the vertical stripe, and then, determines, in step 84, the top and bottom corners of the symbol 38 by using the horizontal stripes. Thereupon, the controller 36 determines, in step 86, how many of the image capture zones are needed based on the size of the symbol 38 and the predetermined storage number of storage bytes in the internal memory 14. Thereupon, the controller 36 digitizes, in step 88, each partial image of the symbol of each image capture zone individually. The digitized data from each zone is readily accommodated in the reduced memory storage capacity of the memory 14. Thereupon, the controller 36 decodes, in step 90, the digitized data from all the zones. Finally, upon a successful decode, a beep is sounded in step 92, and the output formatted data is sent to a host computer for further processing.

In analogous manner, rather than initially determining the top and bottom edges of the symbol, the invention may initially determine the right and left edges of the symbol, and then subsequently determine the vertical image zones in which capturing images allows the corners of the symbol to be located. In addition, if the symbol to be presented to the reader is known, but is not necessarily covered by a centrally located vertical stripe, then a plurality of such vertical stripes properly spaced apart might be used to replace the single vertical stripe described above.

It will be understood that each of the elements described above, or two or more together, also may find a useful application in other types of constructions differing from the types described above.

While the invention has been illustrated and described as an imaging reader for reading two-dimensional symbols with a low cost controller having a limited internal memory of small capacity, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An imaging reader for electro-optically reading a two-dimensional symbol, comprising:
    a solid-state imager supported by the reader and having a two-dimensional array of image sensors for capturing return light from the symbol as pixel data over a field of view, the array having a predetermined pixel count number of the sensors;
    a memory having a predetermined storage number of storage bytes that is less than the pixel count number;
    a controller operatively connected to the imager and the memory, for determining a size and a location of the symbol in the field of view, for mapping and subdividing the symbol into a plurality of image capture zones as a function of the determined size and location of the symbol, for sequentially capturing the return light from each zone, for sequentially storing the pixel data from each zone into the memory, for sequentially digitizing the stored pixel data from each zone as digitized data, and for decoding the digitized data from all the zones; and
    wherein said digitizing the stored pixel data from each zone further comprises dividing the stored pixel data into multiple groups, determining one value for each one of the multiple groups based upon the values of pixel data in said group, and storing the one value for each one of the multiple groups as the digitized data.

2. The reader of claim 1, wherein the predetermined storage number of storage bytes of the memory is an order of magnitude less than the pixel count number of the array.

3. The reader of claim 1, wherein the memory is random access memory internally integrated into the controller.

4. The reader of claim 1, wherein the two-dimensional array is arranged in mutually perpendicular rows and columns, and wherein the controller is operative for enabling the imager to capture the return light over a plurality of columns centrally located in the field of view, to determine top and bottom edges of the symbol.

5. The reader of claim 4, wherein the controller is operative for enabling the imager to capture the return light over a plurality of upper rows in which the top edge is centrally located, and over a plurality of lower rows in which the bottom edge is centrally located, to determine top and bottom corners of the symbol.

6. The reader of claim 5, wherein the controller is operative for determining the number of the image capture zones based on the determined size of the symbol and the predetermined storage number of storage bytes in the memory.

7. The reader of claim 1, wherein the zones overlap.

8. An imaging reader for electro-optically reading a two-dimensional symbol, comprising:
- imager means for capturing return light from the symbol as pixel data over a field of view with a two-dimensional array of image sensors, the array having a predetermined pixel count number of the sensors;
- memory means having a predetermined storage number of storage bytes that is less than the pixel count number;
- control means for determining a size and a location of the symbol in the field of view, for mapping and subdividing the symbol into a plurality of image capture zones as a function of the determined size and location of the symbol, for sequentially capturing the return light from each zone, for sequentially storing the pixel data from each zone into the memory means, for sequentially digitizing the stored pixel data from each zone as digitized data, and for decoding the digitized data from all the zones; and
- wherein said digitizing the stored pixel data from each zone further comprises dividing the stored pixel data into multiple groups, determining one value for each one of the multiple groups based upon the values of pixel data in said group, and storing the one value for each one of the multiple groups as the digitized data.

9. A method of electro-optically reading a two-dimensional symbol, comprising the steps of:
- capturing return light from the symbol as pixel data over a field of view of a solid-state imager having a two-dimensional array of image sensors;
- configuring the array with a predetermined pixel count number of the sensors;
- configuring a memory with a predetermined storage number of storage bytes that is less than the pixel count number;
- determining a size and a location of the symbol in the field of view;
- mapping and subdividing the symbol into a plurality of image capture zones as a function of the determined size and location of the symbol;
- sequentially capturing the return light from each zone;
- sequentially storing the pixel data from each zone into the memory;
- sequentially digitizing the stored pixel data from each zone as digitized data, wherein said digitizing the stored pixel data from each zone further comprises dividing the stored pixel data into multiple groups, determining one value for each one of the multiple groups based upon the values of pixel data in said group, and storing the one value for each one of the multiple groups as the digitized data; and
- decoding the digitized data from all the zones.

10. The method of claim 8, wherein the step of configuring the memory is performed by configuring the predetermined storage number of storage bytes of the memory to be an order of magnitude less than the pixel count number of the array.

11. The method of claim 8, wherein the digitizing step is performed by a microprocessor, and wherein the step of configuring the memory is performed by integrating random access memory into the microprocessor.

12. The method of claim 9, and the step of arranging the two-dimensional array in mutually perpendicular rows and columns; and the step of determining top and bottom edges of the symbol by enabling the imager to capture the return light over a plurality of columns centrally located in the field of view.

13. The method of claim 12, and the step of determining top and bottom corners of the symbol by enabling the imager to capture the return light over a plurality of upper rows in which the top edge is centrally located, and over a plurality of lower rows in which the bottom edge is centrally located.

14. The method of claim 13, and the step of determining the number of the image capture zones based on the determined size of the symbol and the predetermined storage number of storage bytes in the memory.

15. The method of claim 9, and the step of overlapping the zones.

* * * * *